United States Patent [19]
Tomita et al.

[11] Patent Number: 5,985,388
[45] Date of Patent: Nov. 16, 1999

[54] MULTI-LAYER TRANSPARENT SEALANT FILM FOR LAMINATING COMPRISING HIGH DENSITY POLYETHYLENE LAYER AND PACKAGING FLIM AND POUCH USING THE SAME

[75] Inventors: Miyuki Tomita; Junji Yotsuyanagi; Tomohiko Ezaki, all of Kanagawa, Japan

[73] Assignee: Showa Denko K.K., Tokyo, Japan

[21] Appl. No.: 08/827,187

[22] Filed: Mar. 27, 1997

Related U.S. Application Data

[63] Continuation-in-part of application No. 08/791,068, Jan. 29, 1997, abandoned, which is a continuation of application No. 08/530,522, Sep. 19, 1995, abandoned.

[30] Foreign Application Priority Data

Sep. 21, 1994 [JP] Japan ................................ 6-252793

[51] Int. Cl.⁶ ............................... B32B 27/32; B32B 1/02
[52] U.S. Cl. ..................... 428/35.2; 428/35.4; 428/36.6; 428/475.8; 428/476.9; 428/483; 428/508; 428/516; 428/518
[58] Field of Search ................................ 428/34.3, 35.2, 428/212, 213, 215, 216, 218, 475.8, 476.9, 516, 483, 508, 518, 35.4, 36.6

[56] References Cited

U.S. PATENT DOCUMENTS

| | | |
|---|---|---|
| 4,460,631 | 7/1984 | Stegmeier et al. ........................ 428/35 |
| 4,891,253 | 1/1990 | Mueller . |
| 4,906,517 | 3/1990 | Akao et al. . |
| 5,026,610 | 6/1991 | Harrison ................................. 428/516 |
| 5,221,570 | 6/1993 | Gokcen et al. ......................... 428/215 |
| 5,712,006 | 1/1998 | Marano et al. ........................ 428/34.2 |
| 5,783,269 | 7/1998 | Heilmann et al. ..................... 428/35.2 |

FOREIGN PATENT DOCUMENTS

| | | |
|---|---|---|
| 0052262 | 5/1982 | European Pat. Off. . |
| 0276018 | 7/1988 | European Pat. Off. . |

OTHER PUBLICATIONS

Database WPI, Week 9025, Derwent Publications Ltd., London, GB; AN 90–190678 & JP–A–2 127 041 Mitsui Toatsu Chem.) May 15, 1990 (Abstract).
Database WPI Week 8942, Derwent Publications, Ltd. London, GB; AN 89–303691 & JP–A–1 222 920 (Showa Denko KK) Sep. 6, 1989 (Abstract).
Database WPI Week 9138, Derwent Publications Ltd., London, GB; AN 91–277118 7 JP–A–3 182 348 (Nippon Unicar KK) Aug. 8, 1991 (Abstract).

*Primary Examiner*—Paul Thibodeau
*Assistant Examiner*—D. Lawrence Tarazano
*Attorney, Agent, or Firm*—Sughrue, Mion, Zinn, Macpeak & Seas, PLLC

[57] ABSTRACT

A multi-layer sealant film having a high transparency, which comprises: (1) a high-density polyethylene layer comprising a high-density polyethylene having a melting point of not less than 122° C. and a crystallization temperature of not less than 110° C.; and (2) a polyolefin layer comprising a polyolefin having a crystallization temperature of not more than 109° C., wherein the multi-layer sealant film is produced by co-extruding the high-density polyethylene and the polyolefin to form a multi-layer film, and the high-density polyethylene layer is used as a heat seal layer. Also disclosed are a multi-layer packaging film comprising the multi-layer sealant film having a transparent substrate on the side opposite to layer (1), and a pouch obtained by heat-sealing the packaging film so that layer (1) comes to be the innermost layer thereof.

6 Claims, No Drawings

MULTI-LAYER TRANSPARENT SEALANT FILM FOR LAMINATING COMPRISING HIGH DENSITY POLYETHYLENE LAYER AND PACKAGING FLIM AND POUCH USING THE SAME

This is a Continuation-in-Part of application Ser. No. 08/791,068 filed Jan. 29, 1997 now abandoned, which is a Continuation of application Ser. No. 08/530,522 filed Sep. 19, 1995 now abandoned.

FIELD OF THE INVENTION

The present invention relates to a multi-layer sealant film for lamination, which is suitable for use in the fields of food and medicine, excellent in transparency to the extent that the transparency thereof is not lost even when subjected to a heat sterilization treatment at 121° C. for 30 minutes, and which exhibits almost no curling tendency even when subjected to a heat sterilization treatment at 121° C. for 30 minutes. More specifically, the present invention relates to a multi-layer transparent sealant film which can be used as a retort pouch for food, by laminating with a heat-resistant film, such as nylon and polyester. The transparency is not particularly limited, the present invention also relates to a multi-layer sealant film which can be used for the above described purpose by laminating with an aluminum foil which is excellent in heat resistance and gas barrier properties, as well as light-shielding properties.

BACKGROUND OF THE INVENTION

Many types of thermoplastic resin films are currently on the market as transparent films for packaging. As transparent films for food or medicine, high-pressure low-density polyethylene films and linear low-density polyethylene films are generally widely used. However, these films have poor heat resistance, and can not withstand heat sterilization treatment at 121° C. for 30 minutes.

Polypropylene films are also excellent in transparency and strength, and therefore widely used. However, polypropylene resins must be compounded with stabilizers such as antioxidants because of their poor oxidation resistance, light stability and heat stability, which makes it impossible to use them for contents requiring extraction characteristics, particularly food for babies and medicine. Further, polypropylene films can not be used for packaging for cold or refrigeration storage because the polypropylene resins have poor low-temperature characteristics and become brittle at low temperatures.

Polyethylene terephthalate films, which are transparent and have excellent strength, are disadvantageous because of poor heat sealing property and difficulty in making a pouch.

High-density polyethylene is excellent in heat sealing property, heat sterilization characteristics and heat stability. Accordingly, it does not require the aid of antioxidants and is excellent also in extraction characteristics. However, there is a problem with respect to high-density polyethylene as follows. If high-density polyethylene is rapidly quenched by a chill roll and the like, it undergoes rapid volume shrink to cause wrinkles on the surface thereof. The wrinkles deteriorate the conformity with the chill roll, to thereby cause uneven quenching. As a result, transparency of the resulting high-density polyethylene film is deteriorated. Although a film having a smooth surface would be attained by higher chill roll temperature, this deteriorates the transparency. In view of the above, a sealant film which comprises a high-density polyethylene interlayer having low-density polyethylene layers laminated on both sides thereof has been proposed. However, this sealant film cannot endure a heat sterilization treatment at 121° C. for 30 minutes.

SUMMARY OF THE INVENTION

An object of the present invention to provide a multi-layer sealant film which is excellent in transparency, particularly transparency after a heat sterilization treatment at 121° C. for 30 minutes, exhibits no curling tendency, and satisfies heat sealing property, heat sterilization characteristics and extraction characteristics as a film for packaging used in the fields of food and medicine.

Another object of the present invention is to provide a highly transparent multi-layer film for packaging used in the fields of food and medicine, which is endurable with a heat sterilization treatment at 121° C. for 30 minutes.

A further other object of the present invention is to provide a pouch endurable with a heat sterilization treatment at 121° C. for 30 minutes, for use in the fields of food and medicine.

Other objects and effects of the present invention will be apparent from the following description.

The above objects of the present invention has been achieved by providing:

(i) a multi-layer sealant film having a high transparency, which comprises:
  (1) a high-density polyethylene layer comprising a high-density polyethylene having a melting point of not less than 122° C. and a crystallization temperature of not less than 110° C.; and
  (2) a polyolefin layer comprising a polyolefin having a crystallization temperature of not more than 109° C.,
wherein the multi-layer sealant film is produced by co-extruding the high-density polyethylene and the polyolefin to form a multi-layer film, and the high-density polyethylene layer is used as a heat seal layer;

(ii) a multi-layer packaging film, which comprises:
  (a) a multi-layer sealant film, which comprises:
    (1) a high-density polyethylene layer comprising a high-density polyethylene having a melting point of not less than 122° C. and a crystallization temperature of not less than 110° C.; and
    (2) a polyolefin layer comprising a polyolefin having a crystallization temperature of not more than 109° C.,
    wherein the multi-layer sealant film is produced by co-extruding the high-density polyethylene and the polyolefin to form a multi-layer film; and
  (b) a substrate adhered to the multi-layer sealant film on the side opposite to layer (1); and (iii) a pouch which comprises a multi-layer packaging film comprising:
  (a) a multi-layer sealant film comprising:
    (1) a high-density polyethylene layer comprising a high-density polyethylene having a melting point of not less than 122° C. and a crystallization temperature of not less than 110° C.; and
    (2) a polyolefin layer comprising a polyolefin having a crystallization temperature of not more than 109° C.,
    wherein the multi-layer sealant film is produced by co-extruding the high-density polyethylene and the polyolefin to form a multi-layer film; and
  (b) a substrate adhered to the multi-layer sealant film on the side opposite to layer (1), wherein the pouch is prepared by a process comprising heat-sealing the multi-layer packaging film so that layer (1) comes to be the innermost layer thereof. The preparation of the multi-layer packaging film is generally carried out by turning up the packaging film so that layer (1) comes to be the innermost layer, and heat-sealing the side edges of the facing layer (1).

DETAILED DESCRIPTION OF THE INVENTION

The high-density polyethylene used in the present invention indicates a peak temperature of crystal melting curve (hereinafter referred to as "melting point") at 122° C. or more, preferably 124° C. or more, when measured at a temperature increasing rate of 10° C. with a differential scanning calorimeter (DSC) according to a method of JIS K7121, and has a peak temperature of crystallization curve (hereinafter referred to as "crystallization temperature") of 110° C. or more, when measured at a temperature decreasing rate of 10° C. with a DSC according to a method of JIS K7121. Further, the melt flow rate (MFR) of the high-density polyethylene measured according to JIS K-7210 at a temperature of 190° C. and a load of 2.16 kg is preferably from 0.1 to 50 g/10 min, more preferably from 0.5 to 10 g/10 min.

A melting point of less than 122° C. results in poor heat sterilization due to insufficient heat resistance. An MFR of less than 0.5 g/10 min tends to result in poor formability because of low flowability in forming, and in poor transparency. When the MFR exceeds 10 g/10 min, the formability is good, and transparent films can be obtained, but there are tendency that the strength is decreased. It is preferred from the viewpoint of extraction characteristics that no stabilizers such as antioxidants are added to the high-density polyethylene. While high-density polyethylene having a density ranging from 0.940 to 0.965 g/cm$^3$ can generally be used, high-density polyethylene having a density of 0.940 to 0.950 g/cm$^3$ is preferred in terms of easiness of operation. For the purpose of improving low-temperature heat sealing property or impact strength, the high-density polyethylene can be blended with ethylene-propylene rubber or a low-density ethylene-$\alpha$-olefin copolymer in an amount of 90% by weight or less, preferably 50% or less, considering the heat resistance.

The polyolefin has a crystallization temperature of 109° C. or lower when measured at a temperature decreasing rate of 10° C./minute with a DSC. Examples of the polyolefin include ethylene-$\alpha$-olefin copolymers, low-density polyethylene, and ethylene-propylene random copolymers. In particular, low-density polyethylene having a density of 0.890 to 0.930 g/cm$^3$ (e.g., high-pressure polyethylene, extremely low-density polyethylene, and linear low-density polyethylene) is preferred.

The melting point of the polyolefin is not particularly limited and is preferably 105° C. or higher.

The high-density polyethylene and the polyolefin are co-extruded, and then quenched to produce the multi-layer sealant film according to the present invention. The co-extrusion is generally conducted at a temperature of from 190 to 300° C., preferably from 200 to 250° C.

In the process of the present invention, the quenching can be conducted by contacting a molten film thus co-extruded with a chill roll having a temperature of 10 to 60° C., preferably 20 to 50° C.

When contacting the molten film with a chill roll, it is preferred that the high-density polyethylene layer is made direct in contact with the chill roll. While depending on the thickness of the polyolefin layer, if the chill roll is made in contact with the polyolefin layer, the high-density polyethylene layer tends to be gradually cooled resulting in poor transparency.

If a high-density polyethylene layer is quenched with a chill roll having a low temperature of less than 10° C. directly or even through the polyolefin layer, the difference in the crystal contraction between a portion brought into contact with the chill roll and a portion not brought into contact therewith is greatly developed. As a result, only a stiff multi-layer film having a very uneven surface is formed. If the temperature of the chill roll is elevated to higher than 60° C., an opaque film tends to be formed.

The multi-layer sealant film of the present invention preferably has a thickness of from 17 to 150 $\mu$m, more preferably from 17 to 100 $\mu$m. If the thickness is more than 150 $\mu$m, there tends to be problems in that uniform quenching is difficult to be attained and the transparency of the multi-layer film becomes poor. If the thickness is less than 17 $\mu$m, the strength of the multi-layer film tends to be insufficient and pin holes may be formed.

The thickness of the high-density polyethylene layer is generally from 2 to 100 $\mu$m, preferably from 2 to 50 $\mu$m, more preferably from 2 to 30 $\mu$m. If the thickness is more than 100 $\mu$m, the transparency tends to be poor on quenching, and particularly, when a chill roll is used for quenching, growth of crystalline on the side opposite to the side made in contact with the chill roll tends to occur, resulting in poor transparency.

When the high-density polyethylene layer has the above thickness range, the polyolefin layer preferably has a thickness of 15 $\mu$m or more. Further, the thickness of the polyolefin layer is preferably two times or more that of the high-density polyethylene layer. If the thickness of the polyolefin layer is less than 15 $\mu$m, problems tend to occur in that not only the transparency thereof is deteriorated, but also the moldability of the multi-layer film becomes unstable. Further, the polyolefin layer thickness less than two times the high-density polyethylene layer thickness has a tendency of deterioration in transparency.

In the following description, the high-density polyethylene layer and the polyolefin layer are sometimes referred to as layer (1) and layer (2), respectively.

The multi-layer sealant film of the present invention may have a multi-structure such as those comprising layer (1), layer (2) and layer (1) laminated in this order, or comprising layer (1), layer (2), layer (1) and layer (2) laminated in this order. The above described plural layers (1) and plural layers (2) each may be the same as or different from each other in terms of physical properties, thickness, etc. If the sealant film of the present invention has the above described multi-structure, the total thickness of all layers, the total thickness of a plurality of layer (1) and the total thickness of a plurality of layer (2), respectively, preferably fall within the above described respective preferred ranges of thickness.

Further, a film comprising (a) the multi-layer sealant film and (b) a substrate laminated on the (outermost) polyolefin layer of the multi-layer sealant film can be used as a film for packaging having an excellent heat resistance and high transparency.

The substrate for use in the present invention is preferably transparent. Preferred examples of material for the transparent substrate include, for example, nylon, a polyester, polyvinylidene chloride, poly(vinyl alcohol) (PVA), an ethylene-vinyl alcohol resin (EVOH) and cellophane. When the film is to be used in fields in which transparency is not required, the substrate comprises opaque material such as paper, an aluminum foil, etc. Of these, preferred material of the substrate for the packaging material used in the fields of food and medicine are an oriented nylon and a polyester for a transparent substrate, and an aluminum foil for an opaque substrate. Particularly, these materials are preferably used as the substrate of a retort pouch for food. In this case, the pouch is formed so that the high-density polyethylene layer is the innermost layer.

The substrate may be co-extruded or laminated through an adhesive such as an adhesive resin or laminated by using no adhesive. Examples of adhesives for dry lamination include a polypropylene maleic anhydride adduct, a polyester-urethane resin, a polyester-epoxy-urethane resin, a polyurethane-polyester-epoxy resin, etc.

In the present invention, the multi-layer film excellent in transparency can be obtained by quenching in the state that the polyolefin having a low crystallization rate, i.e., a crystallization temperature of 109° C. or lower and preferably having a layer thickness two times or more the thickness of the high-density polyethylene layer, coexisted.

The mechanism of this has not been fully elucidated. However, it is considered that, when the high-density polyethylene layer having a high crystallization rate and a crystallization temperature of 110° C. or higher is quenched with a chill roll with the resin layer having a low crystallization rate and preferably having a thickness two times or more the thickness of the high-density polyethylene layer, the strain caused by crystal contraction taking place in the layer having a high crystallization rate is absorbed by the layer having a low crystallization rate, which enables stable cooling, thus obtaining a flat film which is excellent in surface smoothness and transparency and exhibits almost no curling tendency.

The present invention is described in more detail with reference to the following Examples and Comparative Examples, but the present invention should not be construed as being limited thereto.

EXAMPLE 1

Resin 4 shown in Table 1 was used as the high-density polyethylene and Resin 1 (high-pressure low-density polyethylene) shown in Table 1 was used as the polyolefin resin.

By using two extruders having a diameter of 65 mm and an L/D ratio of 28, which were provided with metering type screws (revolutions of 150 rpm and 50 rpm), the polyolefin resin was supplied to the extruder of a revolution of 150 rpm, and the high-density polyethylene was supplied to the extruder of a revolution of 50 rpm. The resins were coextruded through a T-die having a width of 600 mm and a slit of 1 mm at a die temperature of 220° C. The extruded article was then formed at a take-up speed of 12.5 m/min while bringing the high-density polyethylene into contact with a chill roll having a temperature of 23° C. to quench it. As a result, a multi-layer sealant film comprising a polyolefin layer having a thickness of 60 μm and a high-density polyethylene layer having a thickness of 20 μm was obtained.

Onto the polyolefin layer of the thus obtained multi-layer sealant film, an oriented nylon having a thickness of 15 μm was dry-laminated as a substrate through a two-liquid urethane adhesive having a thickness of 2 μm, to thereby prepare a film for packaging. The thus obtained film was cut into the size of 170 mm×140 mm. Two pieces of the cut films were superposed and three sides thereof were heat-sealed with 10-mm thick, to prepare a pouch having one open side. 400 ml of water was put in the pouch and then the opening was heat-sealed with a sealing width of 10 mm to obtain a pouch filled with water.

The pouch filled with water was immersed in hot water at 121° C. for 30 minutes to sterilized. The pouch was measured and evaluated for haze and appearance. The results obtained are shown in Table 2.

EXAMPLE 2

The same procedures as in Example 1 were conducted except that Resin 2 (linear low-density polyethylene containing 8% by weight of butene as a comonomer) was used as the polyolefin. The resulting multi-layer film was evaluated in the same manner as in Example 1. The results obtained are shown in Table 2.

COMPARATIVE EXAMPLE 1

The same procedures as in Example 1 were conducted except that Resin 3 (linear low-density polyethylene containing 7% by weight of butene as a comonomer) was used as the polyolefin. The resulting multi-layer film was evaluated in the same manner as in Example 1. The results obtained are shown in Table 2.

COMPARATIVE EXAMPLE 2

The same procedures as in Example 1 were conducted except that Resin 2 was used instead of Resin 4 in Example 1. The resulting multi-layer film was evaluated in the same manner as in Example 1. The results obtained are shown in Table 2.

EXAMPLE 3

This Example is for the multi-structure comprising layer (1), layer (2) and another layer (1) laminated in this order.

Resin 4 shown in Table 1 was used as the high-density polyethylene and Resin 2 (linear low-density polyethylene containing 8% by weight of butene as a comonomer) shown in Table 1 was used as the polyolefin resin, and further Resin 4 was laminated on the polyolefin layer.

By using three extruders having a diameter of 65 mm and an L/D ratio of 28, which were provided with metering type screws (revolutions of 150 rpm, 50 rpm, and 25 rpm), the polyolefin resin was supplied to the extruder of a revolution of 150 rpm, the high-density polyethylene was supplied to the extruder of a revolution of 50 rpm, and Resin 4 for a layer provided on the side opposite to the high-density polyethylene layer as supplied to the extruder of a revolution of 25 rpm. The resins were coextruded through a T-die having a width of 600 mm and a slit of 1 mm at a die temperature of 220° C. The extruded article was then formed at a take-up speed of 12.5 m/min while bringing it into contact with a chill roll having a temperature of 23° C. to quench it. As a result, a multi-layer sealant film having a structure, high-density polyethylene (Resin 4)/polyolefin (Resin 2)/high-density polyethylene (Resin 4), having a thickness combination of 20 μm/60 μm/10 μm was obtained.

An oriented nylon film having a thickness of 15 μm was dry-laminated to the resulting multi-layer sealant film on the side of the high-density polyethylene layer (10 μm) through a layer of the adhesive same as in Example 1 having thickness of 2 μm.

The resulting laminated film was measured and evaluated for haze and appearance in the same manner as in Example 1. Before heat sterilization, the haze was 6.2% and the appearance was good. After heat sterilization, the haze was 11.4% and the appearance was good.

TABLE 1

|  | Density (g/cm³) | MFR (g/10 min) | Crystallization Temperature (°C.) | Meltiung Point (°C.) |
|---|---|---|---|---|
| Resin 1 | 0.918 | 0.9 | 97 | 107 |
| Resin 2 | 0.916 | 1.1 | 103 | 121 |
| Resin 3 | 0.922 | 1.3 | 111 | 124 |
| Resin 4 | 0.948 | 3.3 | 116 | 132 |

TABLE 2

|  | Example 1 | Example 2 | Comparative Example 1 | Comparative Example 2 |
|---|---|---|---|---|
| (Layer Structure) Thickness: 60/20 (μm) | Resin 1/ resin 4 | Resin 2/ resin 4 | Resin 3/ resin 4 | Resin 1/ resin 2 |
| (Film Properties) Before Heat Sterilization |  |  |  |  |
| Haze (%)*¹ | 6.5 | 5.8 | 12.5 | 5.0 |
| Appearance of Film | Good | Good | Curled | Good |
| After Heat Sterilization*² |  |  |  |  |
| Haze (%)*¹ | 12.1 | 10.8 | 25.5 | Unmeasureable |
| Appearance of Film | Good | Good | Curled | Contracted (no trace of the original form) |

*¹Haze (%): ASTM D-1003
*²Heat sterilization conditions: 121° C., 30 minutes in water As described above, the multi-layer sealant film according to the present invention is a multi-layer sealant film using high-density polyethylene, and a polyolefin resin having a crystallization temperature of 109° C. or lower and preferably having a layer thickness of two times or more the thickness of the high-density polyethylene layer is used in combination, whereby a flat film which is excellent in surface smoothness and transparency and exhibits almost no curling tendency can be obtained.

The multi-layer sealant film of the present invention is a flat film for lamination which is excellent in surface smoothness and transparency and exhibits almost no curling tendency. Therefore, the sealant film is useful as a heat-sealable packaging material for use in the fields of food and medicine, by laminating with a substrate, e.g., an oriented nylon, a polyester, etc. or by laminating with an aluminum foil in case where transparency is not required.

While the invention has been described in detail and with reference to specific examples thereof, it will be apparent to one skilled in the art that various changes and modifications can be made therein without departing from the spirit and scope thereof.

What is claimed is:

1. A transparent multi-layer packaging film comprising a coextruded multi-layer transparent sealing film adhered to the surface of a transparent substrate; said sealing film consists of:

(1) two high density polyethylene layers comprising a high-density polyethylene having a melting point of not less than 122° C. and a crystallization temperature of not less than 110° C. provided on opposite sides of (2) a polyolefin layer comprising a polyolefin having a crystallization temperature of not more than 109° C.

2. The multi-layer packaging film of claim 1, wherein said transparent substrate comprises a material selected from the group consisting of: nylon, polyester, polyvinylidene chloride, polyvinyl alcohol, ethylene/vinyl alcohol copolymer, and cellophane.

3. The multi-layer packaging film of claim 2, wherein said transparent substrate comprises nylon.

4. A transparent pouch comprising a multi-layer packaging film; said packaging film comprises a coextruded multi-layer transparent sealing film adhered to the surface of a transparent substrate; said sealing film consists of:

(1) two high density polyethylene layers comprising a high-density polyethylene having a melting point of not less than 122° C. and a crystallization temperature of not less than 110° C. provided on opposite sides of (2) a polyolefin layer comprising a polyolefin having a crystallization temperature of not more than 109° C.;

said pouch is obtained by heat-sealing said transparent multi-layer packaging film so that the high density polyethylene layer (1), of the multilayer sealing film opposite the side adhered to the substrate, becomes the innermost layer of the pouch.

5. The transparent pouch of claim 4, wherein said transparent substrate comprises a material selected from the group consisting of: nylon, polyester, polyvinylidene chloride, polyvinyl alcohol, ethylene/vinyl alcohol copolymer, and cellophane.

6. The transparent pouch of claim 5, wherein said transparent substrate comprises nylon.

* * * * *